US008493265B2

(12) United States Patent
Cornic et al.

(10) Patent No.: US 8,493,265 B2
(45) Date of Patent: Jul. 23, 2013

(54) RADAR DETECTION METHOD, NOTABLY FOR AIRBORNE RADARS IMPLEMENTING AN OBSTACLE DETECTION AND AVOIDANCE FUNCTION

(75) Inventors: Pascal Cornic, Guilers (FR); Patrick Le Bihan, Lannilis (FR); Stéphane Kemkemian, Paris (FR)

(73) Assignee: Thales, Neuilly sur Seine (FR)

( * ) Notice: Subject to any disclaimer, the term of this patent is extended or adjusted under 35 U.S.C. 154(b) by 111 days.

(21) Appl. No.: 12/969,929

(22) Filed: Dec. 16, 2010

(65) Prior Publication Data
US 2011/0187586 A1     Aug. 4, 2011

(30) Foreign Application Priority Data

Dec. 18, 2009  (FR) ...................................... 09 06171

(51) Int. Cl.
G01S 7/02        (2006.01)
G01S 13/92       (2006.01)
(52) U.S. Cl.
USPC .......................................... 342/196; 342/128
(58) Field of Classification Search
USPC .................................................. 342/128, 196
See application file for complete search history.

(56) References Cited

U.S. PATENT DOCUMENTS

| 3,728,724 | A   |   | 4/1973  | Alpers |   |
|-----------|-----|---|---------|--------|---|
| 4,743,910 | A   |   | 5/1988  | Hill et al. |   |
| 5,374,903 | A   |   | 12/1994 | Blanton |   |
| 6,317,073 | B1  | * | 11/2001 | Tamatsu et al. | 342/70 |
| 6,977,611 | B1  | * | 12/2005 | Crabb | 342/122 |

FOREIGN PATENT DOCUMENTS
EP       0310172     4/1989
GB       577854      6/1946

* cited by examiner

Primary Examiner — Matthew M Barker
(74) Attorney, Agent, or Firm — Baker & Hostetler, LLP

(57) ABSTRACT

A method includes: generating a frequency-modulated continuous signal, an emission sequence being formed of successive ramps centered on a carrier frequency; fixing a modulation band $\Delta F$ and the duration Tr of a recurrence in such a way that at the range limit, a reception ramp appears shifted by at least one given frequency with respect to the corresponding emission ramp, on account of the propagation delay for the outward-return journey to a target $kTr+\theta$, k being an integer and $\theta$ a duration less than Tr; demodulating the signal received by the signal emitted, the resulting signal including a first sinusoid at the frequency $\delta Fdim=(1-(\theta/Tr))\cdot\Delta F$ and a second sinusoid at the frequency $\delta Fd=(\theta/Tr)\cdot\Delta F$; sampling the resulting signal and performing a first fast Fourier transformation on this resulting signal over the duration of each emission ramp; detecting in the resulting spectrum the spectral lines appearing at the frequencies $\delta Fd$ and $\delta Fdim$, and performing the vector sum of these two spectral lines after resetting them into phase with respect to one another; and performing a detection by comparing the modulus of the vector sum with a predetermined threshold.

14 Claims, 3 Drawing Sheets

RADAR DETECTION METHOD, NOTABLY FOR AIRBORNE RADARS IMPLEMENTING AN OBSTACLE DETECTION AND AVOIDANCE FUNCTION

CROSS-REFERENCE TO RELATED APPLICATION

This application claims priority to foreign French patent application No. FR 09 06171, filed on Dec. 18, 2009, the disclosure of which is incorporated by reference in its entirety.

FIELD OF THE INVENTION

The present invention relates to a radar detection method, such as for radars in which the waveform includes a string of frequency ramps and where the propagation time for the outward-return journey to a target may be greater than the duration of an elementary ramp.

The invention applies to obstacle detection and avoidance function, also called "Sense & Avoid," with which aircraft are equipped, for example.

BACKGROUND OF THE INVENTION

The implementation for aircraft, in particular for drones, of a non-cooperative radar function for detecting aerial obstacles is essential to allow the insertion of autopiloted aircraft into the unsegregated airspace. It participates in the obstacle detection and avoidance function known by the name "Sense and Avoid".

The field of application of the invention is notably that of short- and medium-range radars, not requiring a large antenna area, but requiring very good angular precision. This is the case in particular for radars intended for the "Sense & Avoid" function.

Certain problems encountered for radar implementation of "Sense & Avoid" type may be encountered in other contexts in so far as the constraints weighing on the definition of the radar are analogous.

Radar architectures with simultaneous and continuous emission and reception are considered for the applications concerned, allowing best use to be made of the mean power available at the level of the solid-state power amplifiers, notably according to the solutions set forth in the French patent applications with the filing numbers FR 09 03799 and FR 09 04394.

One problem to be solved is the defining of a continuous waveform and of an associated detection processing allowing at one and the same time:
  non-ambiguous processing in the Doppler domain;
  a significant instrumented distance domain;
  maximum efficiency of the waveform;
  sufficient distance resolution to make it possible to limit the dynamics of the signal received on the ground clutter, to filter the near-distance rain echoes and to reduce the impact of emission and reception leakages on the sensitivity of the radar.

The solutions generally implemented in respect of such a problem consist in using waveforms that are modulated linearly in the form of a frequency ramp, of FMCW type. It is also possible to provide time intervals between the ramps.

In a conventional manner, the processing of the distance measurements, on reception, consists, for each ramp, in demodulating the signal received by the image of the signal emitted, in sampling the signal thus demodulated, and then in performing a digital Fourier transform on the sampled signal. This first step makes it possible to separate the targets in the distance domain. A second Fourier transform performed from ramp to ramp makes it possible to separate the targets by Doppler processing in the speed domain. To be able to use such a waveform, the instrumented range of the radar must be such that at the maximum detectable distance the propagation delay for the outward-return journey for the emitted wave is much less than the duration of a ramp. The reception ramp then practically coincides with the emission ramp. In this case, the efficiency of the waveform is around 1 and almost all the available emission power may be used to ensure the radar range budget.

On the other hand, when the propagation delay for the outward-return journey is more significant than the duration of a recurrence, waveform efficiency is no longer ensured. This is typically the case for radars implementing the "Sense & Avoid" function. In particular, in this case two conflicting constraints appear. It is indeed impossible to simultaneously optimize the efficiency of the radar waveform and to minimize the noise related to emission leakage.

SUMMARY OF THE INVENTION

The invention overcomes the abovementioned deficiencies. The invention includes processing and parametrization of the radar waveform to allow lossless operation whatever the delay between the ramp emitted and the demodulation ramp.

The invention further includes a continuous-emission radar detection method in which, the propagation delay for a useful target situated at the maximum radar range being greater than the duration of an elementary ramp, the method including at least the following steps:
  generating a frequency-modulated continuous signal, an emission sequence being formed of successive and contiguous ramps, of excursion $\Delta F$ and the duration Tr, which are centred on a carrier frequency F1;
  simultaneously and continuously receiving from at least one target an echo corresponding to the signal emitted, delayed by a propagation time for the outward-return journey to the said target $kTr+\theta$, k being an integer and $\theta$ a duration less than Tr;
  demodulating the signal received by the signal emitted, the resulting signal being composed for each emission ramp of a first section of sinusoid at the frequency $\delta Fdim=(1-(\theta/Tr))\cdot\Delta F$ and of a second sinusoid at the frequency $\delta Fd=(\theta/Tr)\cdot\Delta F$;
  sampling at each ramp, in a continuous manner and in synchronism with the emission signal, the resulting signal, the start and the end of each sampling sequence being chosen respectively at the start and at the end of each emission ramp;
  performing a first digital Fourier transform, termed FFT, on the distance axis on the said resulting signal, at each sequence corresponding to the duration of an emission ramp;
  performing the vector sum of the two spectral lines appearing at the frequencies $\delta Fd$ and $\delta Fdim$ on output from the FFT, after resetting them into phase with respect to one another;
  performing a detection by comparing the modulus of the vector sum with a predetermined threshold.

To sum the spectral lines, the outputs of the distance filters of the FFT on the distance axis of rank k and $k+N-\Delta F\cdot Tr$ are for example coherently summed, N being the number of points of the FFT on the distance axis.

The sampling frequency for the signal received is chosen equal to the modulation band of the emission ramp ΔF so that, by aliasing, the two spectral lines appear in the same distance filter k.

The number of periods traversed by the emission signal is for example integral over the duration of the said emission ramp ΔF.

In a particular mode of implementation, the number of periods traversed by the emission signal being integral over the duration of the ramp, and the sampling frequency being equal to the modulation band of the frequency ramp, the two sinusoids at the frequency $\delta Fdim=(1-(\theta/Tr))\cdot\Delta F$ and at the frequency $\delta Fd=(\theta/Tr)\cdot\Delta F$ are summed after FFT on the distance axis in a coherent manner in the same filter of rank k, without any complementary operation of association, of resetting into phase or of summation.

A second Doppler FFT from ramp to ramp is for example performed on the signal received, after distance-wise Fourier transform, before detection.

Advantageously, the demodulation of the signal received by the signal emitted is performed for example directly in the RF frequency domain.

The demodulation of the signal received by the signal emitted can also be performed in the digital domain, after transposition to intermediate frequency and after coding.

A double demodulation of the signal received is for example performed, a first demodulation by the signal emitted and a second demodulation by the image of the signal emitted delayed, for example by a half-ramp, so as to eliminate target eclipses.

A distance-wise ambiguity resolution is for example performed by repeating the emission and reception sequence with the aid of a second series of ramps, of different elementary duration from Tr.

In another embodiment, a distance-wise ambiguity resolution is performed by repeating the emission and reception sequence with the aid of a second series of ramps of elementary duration equal to Tr which are centred on a carrier frequency F2 difference of the carrier frequency F1.

The radar operating in the X-band, the given frequency is for example substantially equal to 1 MHz.

Advantageously, the method may be used in an obstacle detection and avoidance radar function, termed the "Sense & Avoid" function.

The invention also includes a radar for implementing a detection method described herein, the radar being, for example, able to equip an aircraft.

BRIEF DESCRIPTION OF THE DRAWINGS

Other characteristics and advantages of the invention will become apparent with the aid of the description which follows offered in relation to appended drawings, which represent.

DETAILED DESCRIPTION

Figure 1:
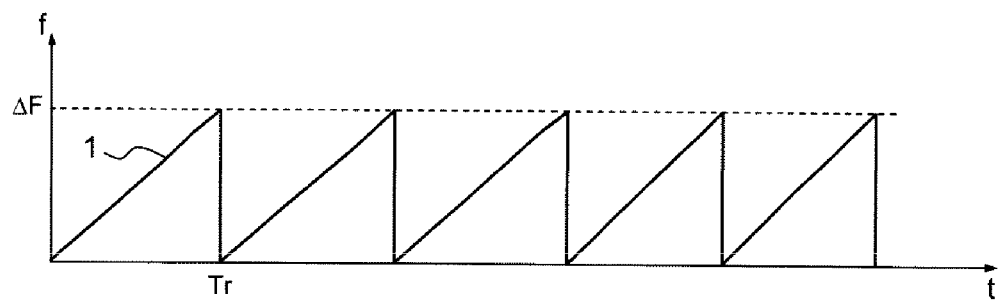
FIG. 1, an emission wave, in the form of linearly frequency-modulated ramps, each ramp corresponding to a recurrence.

FIG. 1 presents, in a system of axes where the abscissae represent the time t and the ordinates the frequency f, a linearly modulated waveform in the form of frequency ramps 1 of amplitude, or modulation band, ΔF and of duration Tr. Such a waveform is conventionally called FMCW according to the expression "Frequency Modulation Continue Wave".

The processing of the distance measurements, at reception, includes, for each ramp, demodulating the signal received by the image of the signal emitted, sampling the signal thus demodulated, and performing a digital Fourier transform on the sampled signal. This first step makes it possible to separate the targets in the distance domain. A second Fourier transform performed from ramp to ramp makes it possible to separate the targets by Doppler processing in the speed domain.

Figure 2:
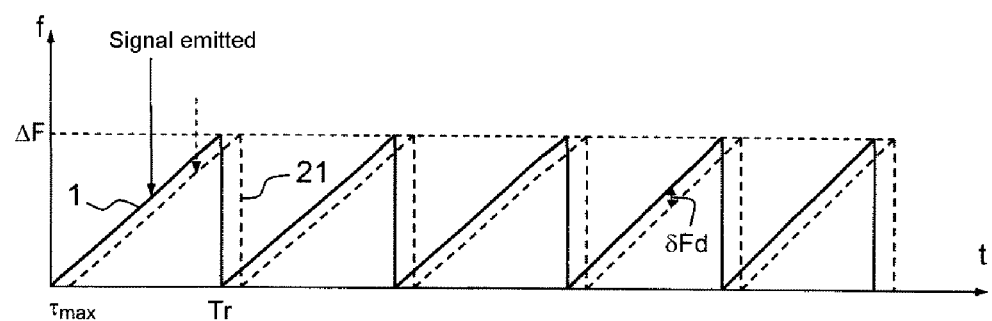
FIG. 2, the previous emission waveform and the echo waveform on reception, in the case where the propagation delay for the outward-return journey is sufficiently small for the emission and reception wave to almost coincide.

FIG. 2 presents the waveform 21 of the signal received, in the form of frequency ramps, opposite the waveform of the signal emitted 1 of FIG. 1. The two series of ramps are separated by a time $T_{max}$ corresponding to the propagation time for the outward-return journey. To be able to use a waveform of the type of FIG. 1, the radar's instrumented range defined by the maximum attainable distance $D_{max}$ must be such that at this maximum distance $D_{max}$ the propagation time for the outward-return journey $T_{max}=2\,D_{max}/c$ is much less than the duration of the ramp, in accordance with the example illustrated by FIG. 2. The reception ramp 21 then almost coincides with the emitted ramp 1.

Under these conditions, for each of the ramps, the useful signal is present for a time $Tr-T_{max}$ and efficiency of the waveform η is given by the following relation:

$$\eta=(Tr-T_{max})/Tr \tag{1}$$

The first part of the ramp received, lying between 0 and $T_{max}$, is not utilized for detection. In so far as the propagation delay $T_{max}$ is small compared with the duration of recurrence Tr of the ramps, the efficiency of the waveform is around 1 and almost all the power available at the level of the power amplifiers may be used to ensure the radar range budget. Moreover, no condition is imposed on the phase coherence of the reference oscillator of the radar, from ramp to ramp.

For a target at the distance $D=c\cdot T/2$, the beat frequency δFd is given by the following relation:

$$\delta Fd=(T/Tr)\cdot\Delta F \tag{2}$$

This frequency therefore increases linearly with distance D and is a maximum at the maximum range $D_{max}$. However, the phase noise carried by the emission leakage in the radar's receiver decreases as a function of frequency f, following a $1/f^\alpha$ law, this being equivalent here to $1/D^\alpha$ for α<4. Moreover, the noise of the reception mixers decreases as 1/f as a function of frequency f, or else as 1/D.

Thus, by correctly choosing the band and the slope of the modulation, it is possible to fix the beat frequency for the maximum range in such a way that such residual noise is negligible compared with the thermal noise at the maximum range.

This is possible on condition that the spectral purity of the reference oscillator is sufficient and that the decoupling between emission and reception is likewise sufficient. It is considered that a minimum beat frequency of 1 MHz makes it possible to fulfil the preceding conditions if the design rules and the circuits chosen are at the state of the art level.

In this case, the detection is performed in contrast on the thermal noise, and the sensitivity of the radar is a maximum. When the distance decreases, the power of the echo increases as a function of the distance D in accordance with a $1/D^4$ law and increases more rapidly than the spurious noise as $1/D^\alpha$, thereby making it possible to preserve the sensitivity of the radar whatever the distance.

Figure 3:
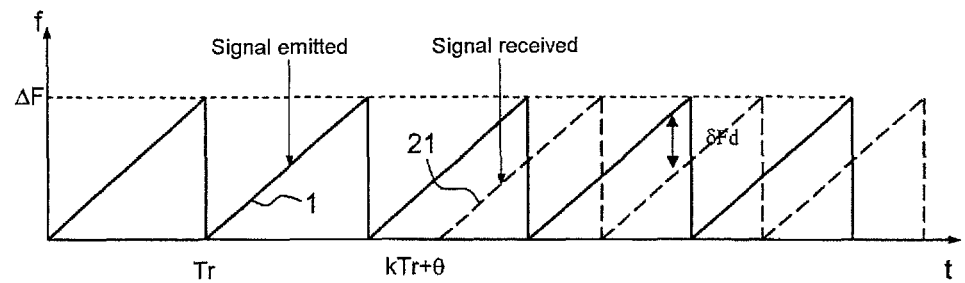
FIG. 3, the two previous waveforms in the case where the propagation delay is more significant than the duration of recurrence.

FIG. 3 illustrates a case where the propagation delay is more significant than the duration of recurrence Tr, the signal received 21 arriving (kTr+θ) after the signal received, θ<Tr. Stated otherwise, the instrumented distance corresponding to the outward-return distance traversed by the radar wave is greater than c.Tr, c being the wave propagation speed. By disregarding the speed coefficient c, it may be said that the instrumented distance is greater than the duration Tr of an elementary ramp.

In the example of FIG. 3, the signal received 21 arrives after two recurrences Tr, i.e. k=2.

The case of FIG. 3 is typically the case for the mode of detection on fast targets, notably for the "Sense & Avoid" function. The Doppler non-ambiguity condition on the ground-clutter domain and targets at maximum approach speed requires that an X-band radar have a PRF, repetition frequency, of greater than or equal to 33 kHz, i.e. a repetition period of less than or equal to 30 µs. At the same time, the range is for example 7 Nm, corresponding to a propagation delay of the order of 86 µs, Nm signifying "Nautical Mile" commonly used in the radar literature. In such a configuration, a target at maximum distance $D_{max}$ responds at ambiguity of rank 3 and the reception ramp may be positioned along the instrumented domain with any delay dependent on the distance from the target.

Under these conditions, two conflicting constraints appear. It is indeed impossible to simultaneously optimize the efficiency of the waveform of the radar and to minimize the noise related to emission leakage. Indeed:
  when the emission and reception ramps coincide, that is to say for a propagation delay T=kTr, the waveform efficiency is 1, but the beat frequency is zero, thereby rendering the signal received undetectable since it is masked by the leakage noise; this results in distance-dependent periodic eclipses, the length of these eclipses being dependent on the quality of the reference oscillator and the decoupling between emission and reception;
  when the emission ramp 1 and reception ramp 21 are shifted by a half-ramp, the beat frequency is a maximum and equal to ΔF/2 and therefore generally significant so that the leakage noise is considered to be negligible, but the waveform efficiency is then a minimum and equals ½, this corresponding to a decrease in the range of 16% with respect to the ideal situation where the shape factor is 1.

Moreover, the radar is ambiguous distance-wise.

For these reasons, FMCW waveforms are not customarily used when the propagation delay corresponding to the maximum instrumented distance $D_{max}$ is not negligible relative to the duration of the ramp.

In the case where the propagation delay is of the same order of magnitude as or more significant than the duration of the recurrence, it is necessary to adapt the waveform and to modify the processing on reception so as to best exploit the available power and optimize the sensitivity of the radar as a function of distance, in particular of the maximum distance.

The solution according to the invention performs notably the following steps:
  generation of a frequency-modulated continuous signal, consisting of successive ramps centred on a carrier at a frequency F1;
  fixing of the modulation band ΔF and of the duration of the recurrence Tr in such a way that at the range limit $D_{max}$, the ramp received appears shifted by at least 1 MHz for example with respect to the ramp emitted, on account of the propagation delay;
  demodulation of the signal received by the signal emitted, sampling of the resulting signal and calculation of an FFT on the result, at each recurrence corresponding to a frequency ramp, i.e. between kTr and (k+1)Tr;
  association in the resulting spectrum of the spectral lines appearing at the frequencies δFd=(θ/Tr)·ΔF and δFdim=(1−θ/Tr)·ΔF;
  calculation of the vector sum of these two spectral lines, after resetting into phase of one with respect to another, this operation having to be performed for all the values of θ;
  calculation of a detection by comparing the modulus of the resulting signal with a predetermined threshold;
  calculation of the ambiguous distance measurement by estimating the phase of the resulting signal;
  the distance ambiguity is resolved by repeating the same process on a carrier F2 by comparing the phases received on the resulting signals at F1 and at F2, this possibly being performed in a sequential manner or by simultaneous emission according to the principles of coloured emission described notably in the aforementioned patent applications FR 09 03799 and FR 09 04394, in this case a part of the emission antenna emitting on the frequency F1 while the other part emits on the frequency F2;
  optionally, if this turns out to be necessary, attenuation of the eclipses by sequentially repeating the whole process with a second waveform of the same modulation band but using a different ramp duration, in the case where, the frequency agility being used in accordance with patent application FR 09 04394, these two waveforms may be generated in a manner which is synchronous with the change of frequency.

A double demodulation of the signal received 21 may be performed so as to eliminate target eclipses. A first demodulation is performed by the signal emitted and the second is performed by the image of the signal emitted, delayed for example by a half-ramp.

Figure 4:
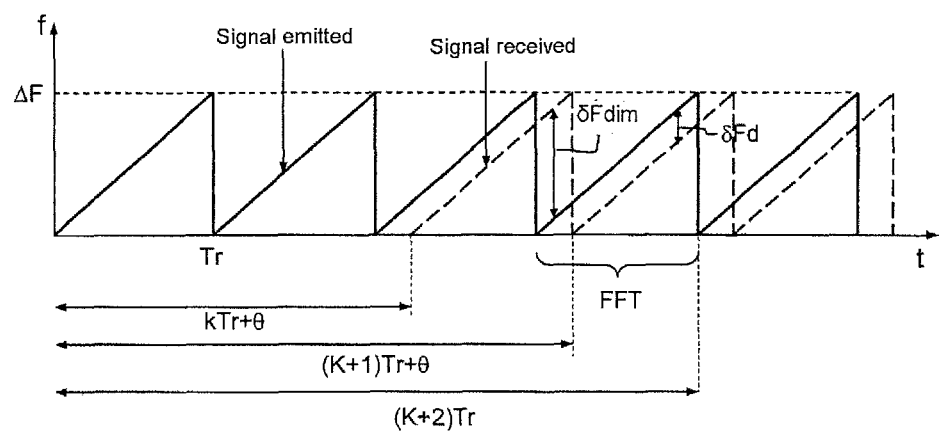
FIG. 4, the two waveforms of FIG. 3 showing the application of an FFT to an emission ramp.

FIG. 4 presents a string of ramps 1 emitted by a radar, in accordance with the waveform of FIG. 1. It also presents the echo signal 21 obtained after a propagation delay that may possibly be greater than the duration of the recurrence Tr as in the case of FIG. 3. This delay is equal to (kTr+θ), k being a positive integer.

Figure 5:
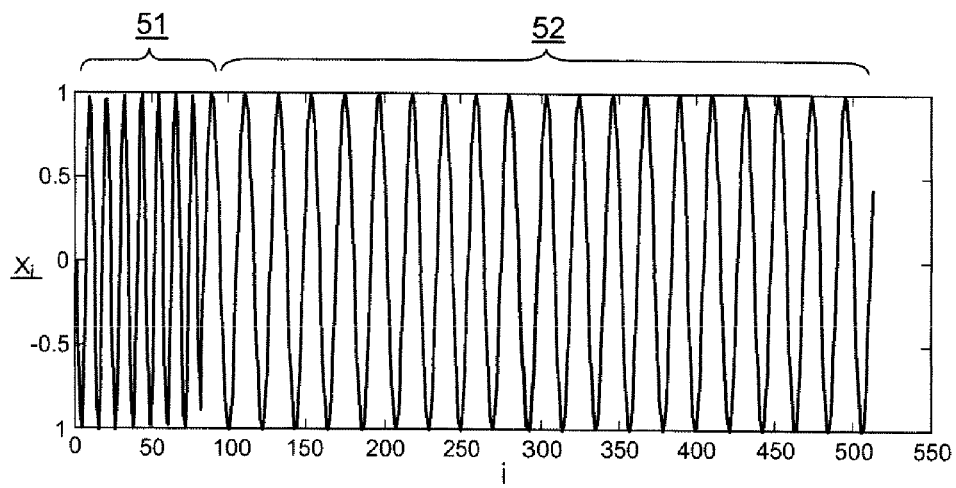
FIG. 5, the signal after synchronous demodulation of an emission ramp formed of two sections of sinusoids.

In a given recurrence, corresponding to the duration of a ramp, the signal obtained at reception after synchronous demodulation of an elementary emission ramp consists of two sections 51, 52 of sinusoids, as illustrated by FIG. 5, the first sinusoid having a frequency/and the second having a frequency $f_2$.

In particular, by referring for example to the recurrence k+1, the emission ramp k+1 is demodulated with the part 41 of the reception ramp of the previous recurrence coinciding with the emission recurrence k+1, the frequency $f_1$ of the first sinusoid 51 is then equal to −δFdim, δFdim being the beat frequency δFdim=(1−θ/Tr)·ΔF, the image of the beat frequency δFd.

Next the emission ramp k+1 is demodulated with the part 42 of the following reception ramp coinciding with the emission ramp k+1, the frequency $f_2$ of the second sinusoid 52 is then equal to $\delta Fd=(\theta/Tr)\cdot\Delta F$.

Thus, for the recurrences of rank greater than k, by choosing the time origin t=0 at the start of the current recurrence, the first sinusoid $S_1(t)$ is present between the instant t=0 and the instant t=θ. It may be written according to the following relation:

$$S_1(t)=\sin[-2\pi(\Delta F/Tr)(Tr-\theta)\cdot t+\phi_1] \quad (3)$$

where $\phi_1$ is the phase at the origin, given by the following relation:

$$\phi_1=2\pi[f_0(Tr-\theta)+(\Delta F/2Tr)(Tr-\theta)^2] \quad (4)$$

$f_0$ being the aforementioned carrier frequency F1, on which the ramp is centred.

The second sinusoid $S_2(t)$ is present between the instant t=θ and the instant t=Tr. It may be written according to the following relation:

$$S_2(t)=\sin[2\pi(\Delta F/Tr)\cdot\theta\cdot t+\phi_2] \quad (5)$$

where $\phi_2$ is the phase at the origin taken at t=θ, given by the following relation:

$$\phi_2=2\pi(f_0\cdot\theta+(\Delta F/2Tr)\cdot\theta^2) \quad (6)$$

If one wishes to take the Doppler effect into account, it is necessary to add $$2\cdot V_r/\lambda$$

to each of the frequencies f, $V_r$ being the Doppler speed and $\lambda=c/f$ the length of the wave emitted.

The phase difference between the two sinusoids 51, 52, $\Delta\phi=\phi_2-\phi_1$, is therefore:

$$\Delta\varphi = 2\pi\left[\left(f_0 + \frac{\Delta F}{2}\right)(T_r - 2\theta)\right] \quad (7)$$

It is noted here that if the RF wave is continuous in phase from ramp to ramp, which amounts to saying that this wave describes an integer number of periods over the duration of the ramp, we have:

$$2\pi\left(f_0 + \frac{\Delta F}{2}\right)Tr = 2p\pi, \text{ with } p \text{ an integer} \quad (7')$$

It follows that $$\Delta\varphi = -4\pi\left[\left(f_0 + \frac{\Delta F}{2}\right)\theta\right]\mathrm{mod}(2\pi) \quad (7'')$$

or else $$\Delta\varphi = -4\pi\frac{p}{Tr}\theta\,\mathrm{mod}(2\pi) \quad (7''')$$

In the general case, taking the Doppler effect into account, this phase difference becomes:

$$\Delta\varphi = 2\pi\left[\left(f_0 + \frac{\Delta F}{2}\right)(T_r - 2\theta) + 2\cdot\frac{V_r}{c}(f_0\cdot Tr + \Delta F\cdot(Tr-\theta)\right] \quad (8)$$

To perform the fast Fourier transform FFT, the signals are sampled.

The sampling frequency Fsmp is equal to N/Tr, N being an integer. The sampling instants of order i, $t_i$, inside a ramp are equal to i·Tr/N. Moreover, we write $\theta=k/\Delta F$.

From relations (3) and (5) are deduced the sampled sinusoids $S_1$ and $S_2$ at the sampling instants of order i, inside a ramp 21 of the echo signal received:

$$S_1(i,k) = \sin(2\pi\cdot i\cdot k/N(1-Tr/\theta)) = \sin\left(2\pi\cdot i\cdot\left(\frac{k}{N}-\Delta F\cdot T_r\right)+\varphi_1\right) \quad (9)$$

and $$S_2(i,k) = \sin\left(2\pi\cdot i\frac{k}{N}+\varphi_2\right) \quad (10)$$

$S_1(i, k)$ and $S_2(i, k)$ the sampled signals of the sinusoid after demodulation at recurrence k in the emission ramp lying between kTr and (k+1)Tr. Likewise, we calculate $S_1(i, k+1)$ and $S_2(i, k+1)$ at recurrence k+1 and so on and so forth, for all the recurrences of an emission sequence.

Figure 6:
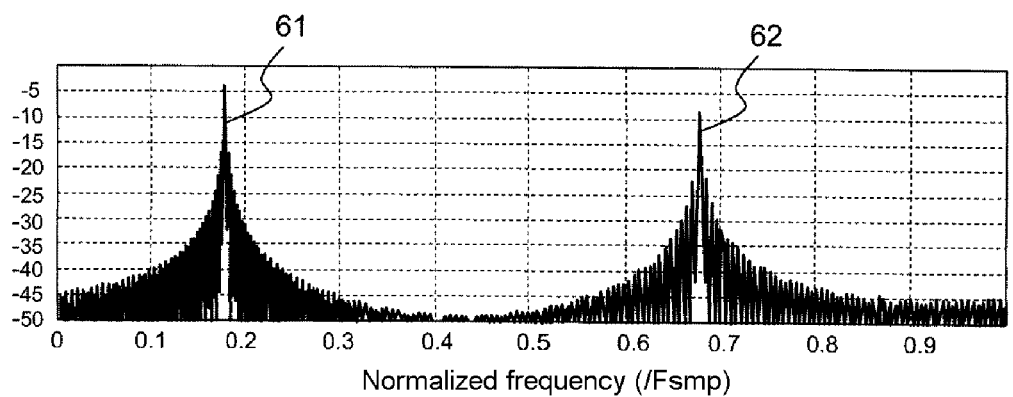
FIG. 6, the frequency spectrum on output from an FFT corresponding to the signal of FIG. 5.

On output from the FFT, by considering only the positive frequencies, the two signals $S_1$ and $S_2$ respond respectively in the filters:

of rank k+N−ΔF·Tr;

and of rank k in accordance with FIG. 6.

This FIG. 6 illustrates the frequency spectrum 61 obtained on output from the FFT with the peaks 61, 62 at the frequencies δFdim and δFd.

The respective amplitudes of the signals at the frequencies δFdim and δFd are k/N and (N−k/N), and their phase shift is Δφ.

If a sampling frequency of double the frequency band is chosen, i.e. Fsmp=2ΔF, the spectral lines 61, 62 appear in the filters of rank k and k+N/2.

By phase shifting the output of the FFT filter of rank k+N−ΔF·Tr by Δφ such as defined by relation (7), disregarding the Doppler, and by summing this phase-shifted signal with the output of the filter of rank k, a coherent sum of the two signals is produced, thereby making it possible to restore a filtering suited to the emitted waveform, whatever the propagation delay, and thus to maximize the signal-to-noise ratio.

In the presence of Doppler, this operation may be performed after Doppler FFT from ramp to ramp, after having compensated, for each Doppler filter, for the delay corresponding to the asynchronism of the two sections of sinusoids 51, 52 received within one and the same ramp. This is performed by phase shifting at the output of each Doppler filter, for all the values of k, the signal $S_2$ corresponding to the second section of sinusoid 52 with respect to the signal $S_1$ corresponding to the first section of sinusoid 51. This phase shift is equal to $$2\pi \frac{k \cdot p}{M \cdot N}$$

where ρ corresponds to the rank of the Doppler FFT filter and M to the number of points on which the Doppler FFT is performed.

The exemplary application presented subsequently is suited to the "Sense & Avoid" function.

In order to obtain the maximum sensitivity at long range, we seek to obtain a beat frequency of greater than 1 Mhz at large distance, on $\delta Fd = \Delta F\theta/Tr$ and $\delta Fdmin = \Delta F(1-\theta/Tr)$.

For example, by choosing a ramp duration $Tr_1 = 23.3$ us, a propagation delay $\tau = 3Tr_1 + \theta 1$ is obtained at 7 Nm.

It follows that:
- $\theta 1 = 16.5$ μs
- $\delta Fd = 0.7\Delta F$
- $\delta Fdim = 0.3\Delta F$ By choosing $\Delta F = 10$ Mhz, and $Fsmp = 20$ Mhz, we obtain:
- $\delta Fd = 7$ Mhz
- $\delta Fdim = -3$ Mhz The detection is performed on the coherent sum of the spectral lines δFd and δFdim.

The spectral line at δFdim affords a more significant contribution than the spectral line at δFd to the detection.

For a distance such that $\theta_1 = Tr_1/2$, i.e. 6.6 Nm, the two spectral lines have the same energy contribution and appear at 5 Mhz and −5 Mhz.

Below this distance, the spectral line at δFd becomes predominant and it is this one which mainly makes it possible to obtain the detection.

For a distance of less than 5.9 Nm, corresponding to a delay of 72.23 μs, the case where $\theta_1 < Tr_1/10$, δFd becomes less than 1 Mhz and the sensitivity is degraded by the presence of noise carried by the emission leakage in the reception window.

The "image" spectral line δFdim is greater than 9 Mhz but is present in the observation window only for 10% of the time. It is therefore not utilizable for detection.

For a distance equal to 5.66 Nm, $\delta Fd = \delta Fdim = 0$. Detection is impossible since the signal is embedded in the emission leakage.

The sensitivity is restored at the distance of 5.42 Nm, corresponding to a delay of 67.5 μs. Indeed at this distance, $\theta_1 = 21$ μs, $\delta Fdim = 1$ Mhz.

By generalizing the reasoning, it is apparent that periodic eclipses appear, situated between $(k-0.1)Tr1$ and $(k+0.1)Tr1$, for all values of k greater than or equal to 1.

To avoid eclipses, it is possible to use a second waveform, identical to the first, but whose ramp duration is different.

The duration of this second ramp $Tr_2$ is chosen so that the eclipses of the two waveforms never coincide, whatever the distance.

For example, by taking $Tr_2 > Tr_1$, the non-coincidence condition may be written:

$$Tr_2 > 1.2 Tr_1$$

This conveys the fact that the lower bound of the eclipse on $Tr_2$ must be greater than the upper bound of the eclipse on $Tr_1$ for k=2 and k=3.

For example, a second value of the duration of the ramp may be fixed at $Tr_2 = 25.7$ μs.

The radar sensitivity is then a maximum whatever the distance, on at least one of the two waveforms.

Another way of avoiding eclipses is to carry out the complex demodulation of the signal received on the basis of the image of the emission ramp, temporally shifted.

By using at least two demodulation ramps shifted with respect to one another by a time equal to half of the duration of the ramp, it is certain that whatever the distance from the target, the demodulated signal appears with a sufficient frequency (for example f>1 Mhz) to be situated off-eclipse on at least one of the two demodulations.

This solution is advantageous since the two modulations may be applied to the signal received in the course of one and the same recurrence, without loss of cycle time or of sensitivity of the radar extractor.

It is also beneficial in so far as the modulation band ΔF can in this case be limited to a smaller value, for example 3 Mhz, while permanently guaranteeing a demodulated signal frequency of greater than 1 Mhz.

The implementation of this variant can be performed directly at RF frequency.

In this case two synchronized and mutually coherent waveform generators using DDS circuits are used.

The implementation can also be performed digitally, after transposition to intermediate frequency and after coding.

It is indeed possible with the digital hardware components available on the market to generate a demodulation signal that is synchronous and perfectly coherent with the emission signal.

In this case the demodulation signal is constructed on the basis of a string of discrete phases describing the same modulation as the modulation signal used for emission, the whole being transposed into intermediate frequency.

In the latter case, the demodulation followed by the Fourier transform corresponds to a numerical correlation analogous to a pulse compression on a Chirp signal.

If such a technique is used, it is easy to resolve the eclipses by carrying out two demodulations with the aid of two digital ramps mutually temporally shifted by a half-ramp.

Advantageously, the invention makes it possible to increase the range of the radar, to attenuate, or indeed to remove the eclipses related to distance ambiguities, while remaining compatible with the Doppler non-ambiguity requirements.

Moreover the invention is easy to implement and does not require any complementary means in relation to a radar of conventional FMCW type. In particular, the correlator consists simply of a demodulation, of an FFT and of a vector sum for each FFT filter.

The invention is also compatible with the techniques of coloured emission and of frequency agility and facilitates the angle/distance ambiguity resolution and the estimation of the distance described notably in patent application FR 09 04394, in so far as the primary measurement performed on a single carrier affords access to estimation of the ambiguous distance. Finally, the modulation band required remains small.

In the particular case where the RF wave is continuous in phase from ramp to ramp and the sampling frequency Fsmp is chosen equal to ΔF, the processing can be simplified.

On output from the FFT, considering only the positive frequencies, the two signals $S_1$ and $S_2$ respond respectively in the filters:
of rank $k + N - \Delta F \cdot Tr$;
and of rank k
with $\Delta F \cdot Tr = Fsmp \cdot Tr = N$,
which amounts to saying that the two signals respond in the same filter.

Moreover, the RF wave being continuous in phase, the demodulated signal is likewise continuous in phase. The signal after sampling corresponds to a sinusoid with no phase break over the duration of the ramp. The FFT then carries out the coherent integration of the N samples constituting the ramp and the efficiency of the waveform is equal to one whatever the distance from the target.

What is claimed is:

1. A continuous-emission radar detection method, a propagation delay for a useful target situated at a maximum radar range being greater than a duration of an elementary ramp, said method comprising:
   generating a frequency-modulated continuous signal, an emission sequence being formed of successive and contiguous ramps, of excursion $\Delta F$ and duration Tr, which are centred on a carrier frequency F1;
   simultaneously and continuously receiving from at least one target an echo corresponding to the signal emitted, delayed by a propagation time for an outward-return journey to the at least one target kTr+$\theta$, k being an integer and $\theta$ a duration less than Tr;
   demodulating the signal received by the signal emitted, resulting in a signal being composed for each emission ramp of a first section of sinusoid at a frequency $\delta Fdim = (1-(\theta/Tr))\cdot \Delta F$ and of a second sinusoid at the frequency $\delta Fd=(\theta/Tr)\cdot \Delta F$;
   sampling at the each emission ramp, in a continuous manner and in synchronism with the emission signal, the resulting signal, a start and an end of each sampling sequence being chosen respectively at the start and at the end of the each emission ramp;
   performing a first digital Fast Fourier transform (FFT), on the resulting signal, at each sequence corresponding to the duration of an emission ramp;
   performing a vector sum of two spectral lines appearing at the frequencies $\delta Fd$ and $\delta Fdim$ on output from the FFT, after resetting them into phase with respect to one another; and
   performing a detection by comparing modulus of the vector sum with a predetermined threshold.

2. The method according to claim 1, wherein to vector sum the two spectral lines, outputs of filters of the FFT of rank k and k+N−$\Delta F\cdot Tr$ are coherently summed, N being the number of points of the FFT.

3. The method according to claim 2, wherein a second Doppler FFT from ramp to ramp is performed on the signal received, after Fourier transform, before detection.

4. The method according to claim 1, wherein the sampling frequency for the signal received is chosen equal to a modulation band of the emission ramp $\Delta F$ so that, by aliasing, the two spectral lines appear in a same filter of rank k.

5. The method according to claim 1, wherein the number of periods traversed by the emission signal is integral over the duration of the said emission ramp $\Delta F$.

6. The method according to claim 1, wherein the number of periods traversed by the emission signal being integral over the duration of the ramp, and the sampling frequency being equal to a modulation band of the frequency ramp, the two sinusoids at the frequency $\delta Fdim=(1-(\theta/Tr))\cdot \Delta F$ and at the frequency $\delta Fd=(\theta/Tr)\cdot \Delta F$ are summed after FFT in a coherent manner in same filter of rank k, without any complementary operation of association, of resetting into phase or of summation.

7. The method according to claim 1, wherein the demodulation of the signal received by the signal emitted is performed directly in the RF frequency domain.

8. The method according to claim 1, wherein the demodulation of the signal received by the signal emitted is performed in the digital domain, after transposition to intermediate frequency and after coding.

9. The method according to claim 1, wherein a double demodulation of the signal received is performed, a first demodulation by the signal is emitted and a second demodulation by an image of the signal emitted is delayed.

10. The method according to claim 9, wherein the signal emitted is delayed by a half-ramp.

11. The method according to claim 1, wherein an ambiguity resolution is performed by repeating the emission and reception sequence with an aid of a second series of ramps, of different elementary duration from Tr.

12. The method according to claim 1, wherein an ambiguity resolution is performed by repeating the emission and reception sequence with an aid of a second series of ramps of elementary duration equal to Tr which are centred on a carrier frequency F2 difference of the carrier frequency F1.

13. The method according to claim 1, wherein the radar operates in the X-band, the given frequency is substantially equal to 1 MHz.

14. The method according to claim 1, wherein the method is used in a sense & avoid obstacle detection and avoidance radar function.

* * * * *